(12) United States Patent
Leung

(10) Patent No.: US 7,644,229 B2
(45) Date of Patent: Jan. 5, 2010

(54) RAPID SEARCH SYSTEM AND METHOD IN HIGH CAPACITY HARD DISK DRIVE CLUSTER

(76) Inventor: Kwok-Yan Leung, 53 Applegate Cres., Willowdale, ON (CA) M2H 2R5

( * ) Notice: Subject to any disclaimer, the term of this patent is extended or adjusted under 35 U.S.C. 154(b) by 369 days.

(21) Appl. No.: 11/612,485

(22) Filed: Dec. 19, 2006

(65) Prior Publication Data

US 2008/0147958 A1    Jun. 19, 2008

(51) Int. Cl.
*G06F 12/00*    (2006.01)
(52) U.S. Cl. ..................... 711/114; 710/305
(58) Field of Classification Search .............. None
See application file for complete search history.

(56) References Cited

U.S. PATENT DOCUMENTS

| 6,687,787 | B1 * | 2/2004 | Richardson et al. | 711/114 |
| 6,988,136 | B2 * | 1/2006 | Sicola et al. | 709/224 |

* cited by examiner

*Primary Examiner*—Gary J Portka

(57) ABSTRACT

A rapid search system and method in high capacity hard disk drive clusters includes: designating a specific hard disk drive as a destination hard disk drive with a predetermined purpose using hard disk drive location codes provided in a hard disk device code database, and then finding the destination hard disk drive according to the hard disk drive cabinet code, the hard disk drive drawer code and the hard disk drive code of the specific hard disk drive, whereby communicating with the destination hard disk drive. It does not use broadcast packets to find the destination hard disk drive, and therefore can avoid broadcast storm and system breakdown.

4 Claims, 2 Drawing Sheets

RAPID SEARCH SYSTEM AND METHOD IN HIGH CAPACITY HARD DISK DRIVE CLUSTER

BACKGROUND OF THE INVENTION

1. Field of the Invention

The present invention relates generally to a rapid search system and method, and in particular to a rapid search system and method in high capacity hard disk drive clusters.

2. The Prior Arts

With the network transmission speed getting higher and cost lower, the digital video transmission over network becomes more popular, and meanwhile because the files of digital video are huge by nature, the size of digital storage medium is increasingly getting larger.

Since the size of the digital storage media is getting larger, a single hard disk, or even a single hard disk drive cabinet is not capable of meeting the mass storage requirement for a computer. As a result, two special communication protocols ATA over Ethernet (hereafter, refer to as AoE) and iSCSI are developed to allow the connection of mass storage systems over network.

AoE is a network communication protocol developed by Brantley Coile Company, designed for accessing ATA standard storage devices over ethernet network, therefore to achieve a storage area network through low cost standard technique.

AoE does not rely on network layers such as IP, UDP or TCP, etc. This also means that AoE is not routable through LAN, and therefore AoE is intended for storage area network only.

It is noted that both AoE and iSCSI all emphasize that they are the storage area network solution far cheaper than the Fibre Channel. However, AoE is simpler and cheaper to implement than iSCSI, and in regard to the technical document of the standard specification, the AoE specification is 8 pages compared with iSCSI's 257 pages.

With respect to the hardware support, currently, Coraid EtherDrive® is the hard disk drive cabinet designed for AoE. To the software support, vblade provided by SourceForge® allows the Linux Server installed with vblade to search for an AoE hard disk drive cabinet, and send request of storage service to the hard disk drive cabinet after having found it, whereby to use the storage space and resources thereof. Vblade has two types of status and implementations: a user-space one (part of aoetools package) and another one implemented as a linux kernel module.

Although AoE is a simple network protocol, it still increases the complexity of the storage mechanism, and the detail of AoE will be further described below.

AoE protocol mainly uses block storage transmission. In this case, ATA in AoE is regarded as a wire protocol in AoE. When data needs to be read after it is written to the hard disk, it is in one or more chunks of data called blocks, with each block being fixed-size.

AoE protocol directly and simply puts ATA command into lower-level network packets, which could use ethernet cable as an effective alternative to ribbon cable of ATA interface, and carry out the transmission of data blocks between each node of an ethernet network.

The ribbon cable of ATA standard doesn't care what the data blocks it is transferring, and neither does the AoE standard. Because ethernet cable used by AoE standard doesn't care what data block it is transferring, user could read and write any data block they need, but most of the time, file system is more suitable to organizing and structuring data than block.

Traditionally, the user uses a hard disk of a computer as a file system, and file systems such as ext3, XFS and NTFS are all designed and applied for such assumption. However, when using AoE, since AoE uses an ethernet cable to replace the ribbon cable of ATA, it is possible to violate this assumption. It is dangerous to run a traditional file system over AoE, which may lead to file system corruption or operating system kernel panic.

AoE uses the cluster file system to avoid these above-mentioned problems, which allows the block storage and transfer devices of AoE hard disks and hard disk drive cabinets to be shared by multiple computers accessing and using the devices, without the limitation of prior ATA technique that only allows one sole computer to access the hard disk and hard disk cluster. To the actual operation, the server for accessing an AoE hard disk drive cabinet is like a cluster computer part of a cluster system, which accesses the storage resources using the shared mechanism of the cluster system, and the AoE hard disk drive cabinet is a block storage device operable of sharing. GFS and OCFS2 etc. are commonly used cluster file systems.

With reference to FIG. 1, FIG. 1 is a schematic diagram showing a conventional storage area network. As shown in FIG. 1, in the conventional storage area network, the high capacity hard disk drive clusters mainly comprise a plurality of hard disk drive cabinets 10a~10n, each hard disk drive cabinet comprises a plurality of hard disk drive drawers 11a, 11b, . . . , 11f, 11g, . . . , and each hard disk drive drawer comprises a plurality of hard disk drives 12a, 12b, . . . , 12f, 12g, . . . . When the computers 17a, 17b, . . . , 17g~17n need to communicate with the hard disk drives 12a, 12b, . . . , 12f, 12g, . . . , AoE protocol or iSCSI protocol may be used.

In the AoE protocol, AoE packets use ethernet MAC address to indicate source and destination. A MAC address only works inside a single ethernet network because the MAC address is sent by broadcast in an ethernet broadcast domain. Current ethernet hardware features include flow control, which helps to minimize the bandwidth need for packet retransmission. Ethernet uses the cyclic redundancy checks (CRC) algorithm to ensure that packets arrive intact.

AoE and iSCSI protocols have flow control mechanism, which helps to minimize the bandwidth need for packet retransmission. However, it is still unavoidable that when hard disk drives 12a, 12b, . . . , 12f, 12g, . . . need to transmit data, for example when hard disk drives 12a and 12f have data to be transmitted among each other, they need to send broadcast packets to all the hard disk drives 12a, 12b, . . . , 12f, 12g, . . . , in order to find the designated hard disk drives 12a and 12f. If the number of the hard disk drives is not very large, these broadcast packets may not cause the breakdown of the whole storage system. However, once the number increases to a certain level, it is much possible to cause broadcast storm problem, leading to the breakdown of the whole storage system.

SUMMARY OF THE INVENTION

A primary objective of the present invention is to provide a rapid search system and method in high capacity hard disk drive clusters, which mainly utilize the plurality of preset hard disk drive location codes (each hard disk drive corresponding to its hard disk drive cabinet code, hard disk drive drawer code and hard disk drive code) to find the destination hard disk drive directly while avoiding using the broadcast packets.

According to the above-mentioned objective, the rapid search system and method in high capacity hard disk drive clusters in accordance with the present invention mainly comprises designating a specific hard disk drive as a destination hard disk drive with a predetermined purpose, and then finding the destination hard disk drive pursuant to the hard disk drive cabinet code, the hard disk drive drawer code and the hard disk drive code, whereby communicating with the destination hard disk drive. It does not use broadcast packets to find the destination hard disk drive, and therefore can avoid broadcast storm and system breakdown.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
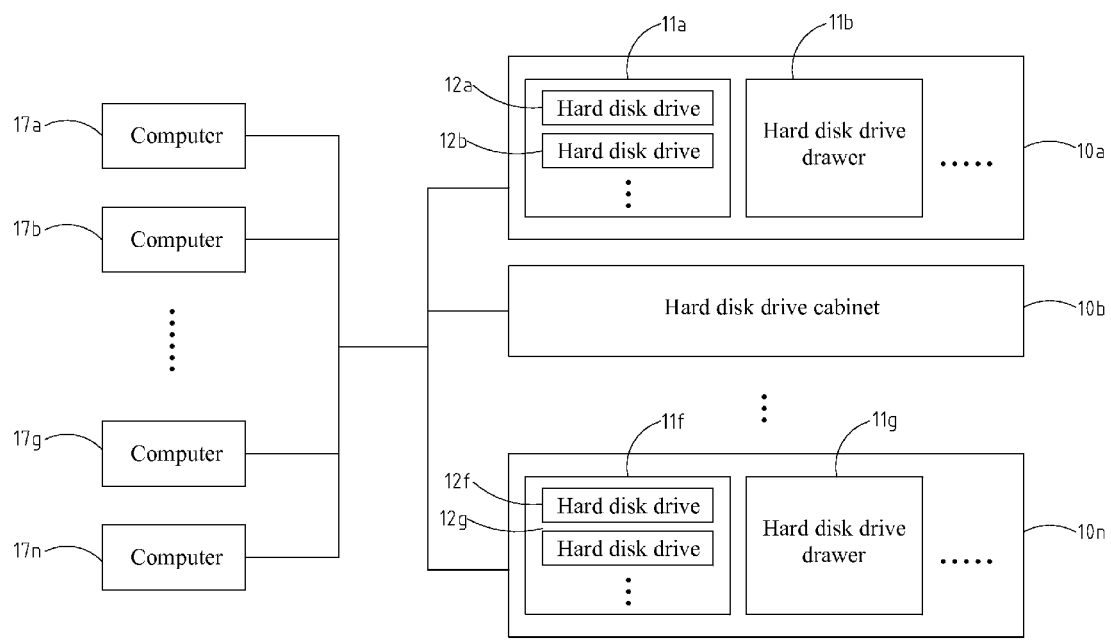
FIG. 1 is a schematic diagram showing a conventional storage area network.
Figure 2:
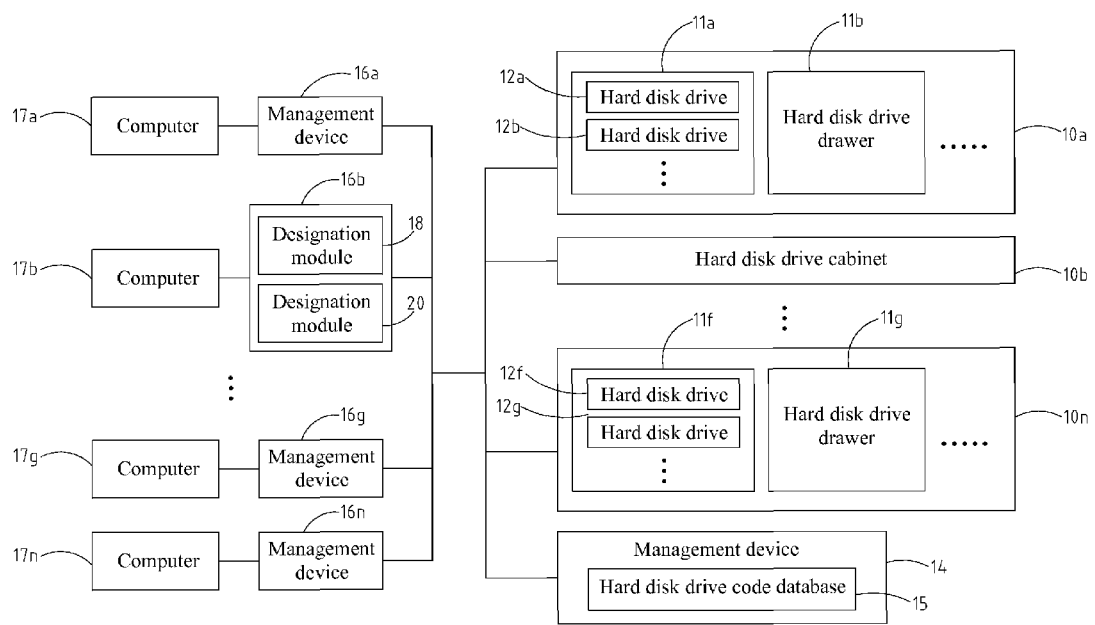
FIG. 2 is a schematic diagram showing a rapid search system in high capacity hard disk drive clusters in accordance with the present invention.

With reference to FIG. 2, FIG. 2 is a schematic diagram showing a rapid search system in high capacity hard disk drive clusters in accordance with the present invention. As shown in FIG. 2, the rapid search system in high capacity hard disk drive clusters in accordance with the present invention mainly comprises a hard disk drive code database 15, a designation module 18 and a communication module 20. The hard disk drive code database 15 may be executed and maintained only in a single management device 14, and shared by all computers 17a~17n. A designation module 18 and a communication module 20 are respectively installed in management devices 16a~16n which are contained in the computers 17a~17n.

In the LAN environment of the network storage in accordance with the present invention, the high capacity hard disk drive clusters comprise a plurality of hard disk drive cabinets 10a~10n, each hard disk drive cabinet 10a~10n comprises a plurality of hard disk drive drawers 11a, 11b, . . . , 11f, 11g, . . . and each hard disk drive drawer comprises a plurality of hard disk drives 12a, 12b, . . . , 12f, 12g, . . . . These hard disk drive cabinets all have a hard disk drive cabinet code, these hard disk drive drawers all have a hard disk drive drawer code, and these hard disk drives all have a hard disk drives code. When the computers 17a, 17b, . . . , 17g~17n need to communicate with the hard disk drives 12a, 12b, . . . , 12f, 12g, . . . , the protocol defined in the present invention is used. The AoE protocol is used in the present invention. In order to avoid broadcast storm problem, the broadcast method is not used to find the destination hard drive disk in the present invention.

Briefly speaking, the rapid search method of the present invention mainly utilizes the plurality of preset hard disk drive location codes (provided by the hard disk drive database 15, with each hard disk drive corresponding to its hard disk drive cabinet code, hard disk drive drawer code and hard disk drive code) to find the destination hard disk drive directly while avoiding using the broadcast packets.

In one embodiment, if the hard drive disks 12a and 12f are assigned to the computer 17b for its use, and the user wants to designate the hard disk drive 12a to be installed with an operation system, and designate the hard disk drive 12f as the backup hard disk or data hard disk of the hard disk drive 12a, the designation module 18 of the management device 16b, which is contained in the computer 17b, first designates the predetermined purpose of the hard drive disk 12a as an operating system hard disk drive (such as running Windows® XP) and designates the predetermined purpose of the hard disk drive 12f as a backup hard disk drive or a data hard disk drive according to the plurality of the hard disk drive location codes in the hard disk drive code database 15. After the designation is finished, the designation module could use the hard disk drive cabinet code, hard disk drive drawer code and hard disk drive code of the destination hard disk drive (namely the hard disk drives 12a and 12f), so as to directly find these two destination disk drives in the later data transmission.

In this case, when the computer 17b sends a command that requires to transmit data from the hard disk drive 12a to the hard disk drive 12f, the communication module 20 which is contained in the computer 17b directly finds the destination hard disk drive pursuant to the hard disk drive cabinet code, the hard disk drive drawer code, and the hard disk drive code, whereby communicating with the destination hard disk drive.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A rapid search system in high capacity hard disk drive clusters, used to rapidly find a destination hard disk drive in the high capacity hard disk drive clusters, the high capacity hard disk drive clusters mainly comprising a plurality of hard disk drive cabinets, each hard disk drive cabinet comprising a plurality of hard disk drive drawers, and each hard disk drive drawer comprising a plurality of hard disk drives, the hard disk drive cabinets each having a hard disk drive cabinet code, the hard disk drive drawers each having a hard disk drive drawer code and the hard disk drives each having a hard disk drive code, the rapid search system comprising:

a hard disk drive code database, for storing a plurality of hard disk location codes, wherein each hard disk location code includes the hard disk drive cabinet code, the hard disk drive drawer code and the hard disk drive code for accessing a hard disk drive;

a designation module for designating a specific hard disk drive as a destination hard disk drive with a predetermined purpose based on the plurality of the hard disk location codes of the hard disk drive code database, and getting the hard disk drive cabinet code, the hard disk drive drawer code and the hard disk drive code of the destination hard disk drive; and a communication module for finding the destination hard disk drive by using the hard disk drive cabinet code, the hard disk drive drawer code and the hard disk drive code associated with the destination hard disk drive to communicate, with the destination hard disk drive without using a broadcast method.

2. The rapid search system in high capacity hard disk drive clusters as claimed in claim 1, wherein the predetermined purpose including using a specific hard disk drive as an operating system hard disk drive, a backup hard disk drive, or a data hard disk drive.

3. A rapid search method in high capacity hard disk drive clusters, used to rapidly find a destination hard disk drive in the high capacity hard disk drive clusters, the high capacity hard disk drive clusters mainly comprising a plurality of hard disk drive cabinets, each hard disk drive cabinet comprising a plurality of hard disk drive drawers, and each hard disk drive drawer comprising a plurality of hard disk drives, the hard disk drive cabinets each having a hard disk drive cabinet code, the hard disk drive drawers each having a hard disk drive drawer code and the hard disk drives each having a hard disk drive code, the rapid search method comprising the steps of:

provide a hard disk drive code database, the hard disk drive code database storing a plurality of hard disk location codes, wherein each hard disk location code includes the hard disk drive cabinet code, the hard disk drive drawer code and the hard disk drive code for accessing a hard disk drive;

designating a specific hard disk drive as a destination hard disk drive with a predetermined purpose based on the plurality of the hard disk location codes of the hard disk drive code database;

getting the hard disk drive cabinet code, the hard disk drive drawer code and the hard disk drive code of the destination hard disk drive; and finding the destination hard disk drive by using the hard disk drive cabinet code, the hard disk drive drawer code and the hard disk drive code associated with the destination hard disk drive to communicate, with the destination hard disk drive without using a broadcast method.

4. The method as claimed in claim 3, wherein the predetermined purpose including using a destination hard disk drive as an operating system hard disk drive, a backup hard disk drive, or a data hard disk drive.

* * * * *